(12) United States Patent
Fukai et al.

(10) Patent No.: US 8,031,316 B2
(45) Date of Patent: Oct. 4, 2011

(54) LIQUID CRYSTAL DISPLAY DEVICE

(75) Inventors: Atsushi Fukai, Mobara (JP); Takeshi Kaneki, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 208 days.

(21) Appl. No.: 12/554,123

(22) Filed: Sep. 4, 2009

(65) Prior Publication Data
US 2010/0060816 A1    Mar. 11, 2010

(30) Foreign Application Priority Data
Sep. 5, 2008  (JP) ................... 2008-228699

(51) Int. Cl.
*G02F 1/1333*   (2006.01)
*G02F 1/1345*   (2006.01)

(52) U.S. Cl. ................. 349/150; 349/151; 349/110

(58) Field of Classification Search .......... 349/150–152, 349/149
See application file for complete search history.

(56) References Cited

U.S. PATENT DOCUMENTS
6,806,936 B2    10/2004  Nakaminami et al.
7,760,284 B2 *  7/2010   Murase ................. 349/58

FOREIGN PATENT DOCUMENTS
JP          3792554         4/2006
* cited by examiner

*Primary Examiner* — Mark Robinson
*Assistant Examiner* — Michael Inadomi
(74) *Attorney, Agent, or Firm* — Antonelli, Terry, Stout & Kraus, LLP.

(57) ABSTRACT

It is an object of the invention to protect a flexible printed circuit of a liquid crystal display device. A liquid crystal display device of the invention includes: a flexible printed substrate that extends as far as a position where it opposes a metal frame; and a light-blocking tape that has a portion that is positioned between a semiconductor integrated circuit and a light source. The light-blocking tape includes: a light-blocking layer that has a first surface that faces a liquid crystal display panel and a second surface that faces a backlight module; a first pressure-sensitive adhesive layer that has a portion that is formed on the first surface of the light-blocking layer and pressure-sensitively adheres to the liquid crystal display panel; and a second pressure-sensitive adhesive layer that has a portion that is formed on the second surface of the light-blocking layer and pressure-sensitively adheres to the backlight module. An insulating tape pressure-sensitively adheres to the first or second pressure-sensitive adhesive layer between the liquid crystal display panel and the backlight module and extends as far as between the flexible printed substrate and the metal frame.

5 Claims, 4 Drawing Sheets

LIQUID CRYSTAL DISPLAY DEVICE

CROSS-REFERENCE TO RELATED APPLICATION

The disclosure of Japanese Patent Application No. 2008-228699 filed on Sep. 5, 2008 including the specification, drawings and abstract is incorporated herein by reference in its entirety.

BACKGROUND

1. Technical Field

The present invention relates to a liquid crystal display device.

2. Related Art

There is known a liquid crystal display module where a flexible printed circuit is connected to a liquid crystal display panel (see Japanese Patent No. 3,792,554). A backlight is mounted on the liquid crystal display panel, and strength is ensured by a frame. The frame made of a metal from the standpoint of strength. The flexible printed circuit may possibly contact the frame because the flexible printed circuit is often bent and used. In that case, preventing breakage and shorting of wires formed on the flexible printed circuit is desired.

SUMMARY

It is an object of the invention to protect a flexible printed circuit of a liquid crystal display device.

(1) A liquid crystal display device pertaining to the invention comprises: a liquid crystal display panel; a semiconductor integrated circuit on the liquid crystal display panel; a backlight module that includes at least a light source and a light guide plate and is disposed opposing the liquid crystal display panel; a metal frame that is made of a metal and has a portion that is positioned around at least one of the liquid crystal display panel and the backlight module; a flexible printed substrate that is mounted on the liquid crystal display panel and extends as far as a position where it opposes the metal frame; a light-blocking tape that has a portion that is positioned at least between the semiconductor integrated circuit and the light source between the liquid crystal display panel and the backlight module; and an insulating tape that is made of an electrical insulator, wherein the light-blocking tape includes a light-blocking layer that has a first surface that faces the liquid crystal display panel and a second surface that faces the backlight module, a first pressure-sensitive adhesive layer that has a portion that is formed on the first surface of the light-blocking layer and pressure-sensitively adheres to the liquid crystal display panel and a second pressure-sensitive adhesive layer that has a portion that is formed on the second surface of the light-blocking layer and pressure-sensitively adheres to the backlight module, and the insulating tape pressure-sensitively adheres to the first or second pressure-sensitive adhesive layer between the liquid crystal display panel and the backlight module and extends as far as between the flexible printed substrate and the metal frame. According to the invention, the flexible printed substrate can be protected from the metal frame by the insulating tape, and the number of parts does not increase because the first or second pressure-sensitive adhesive layer of the light-blocking tape is used to attach the insulating tape.

(2) In the liquid crystal display device, the insulating tape may extend over the metal frame from the light-blocking tape and bend in a direction where it is side-by-side with the metal frame on the outer side of the metal frame.

(3) In the liquid crystal display device, the insulating tape may pressure-sensitively adhere to the first pressure-sensitive adhesive layer and contact the liquid crystal display panel in a state where it has none of pressure-sensitive adhesion, adhesion and fixed adhesion with respect to the liquid crystal display panel.

(4) In the liquid crystal display device, the insulating tape may pressure-sensitively adhere to the second pressure-sensitive adhesive layer and contact the backlight module in a state where it has none of pressure-sensitive adhesion, adhesion and fixed adhesion with respect to the backlight module.

(5) In the liquid crystal display device, the insulating tape may contact the metal frame in a state where it has none of pressure-sensitive adhesion, adhesion and fixed adhesion with respect to the metal frame.

DETAILED DESCRIPTION

Embodiments of the invention will be described below with reference to the drawings.

First Embodiment

Figure 1:
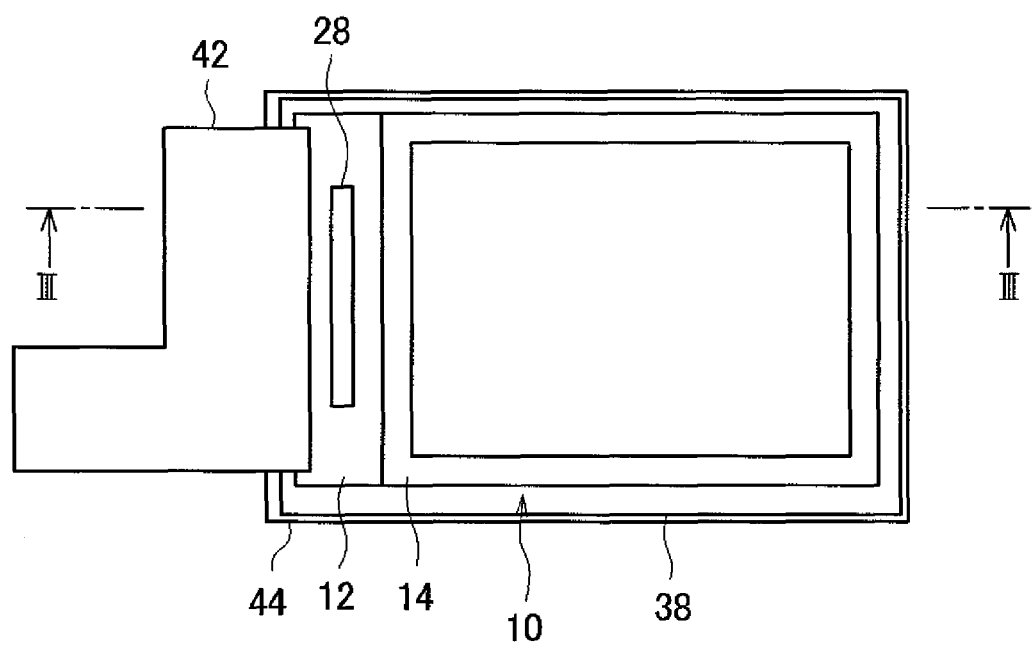
FIG. 1 is a plan view showing a liquid crystal display device pertaining to a first embodiment of the invention.
Figure 2:
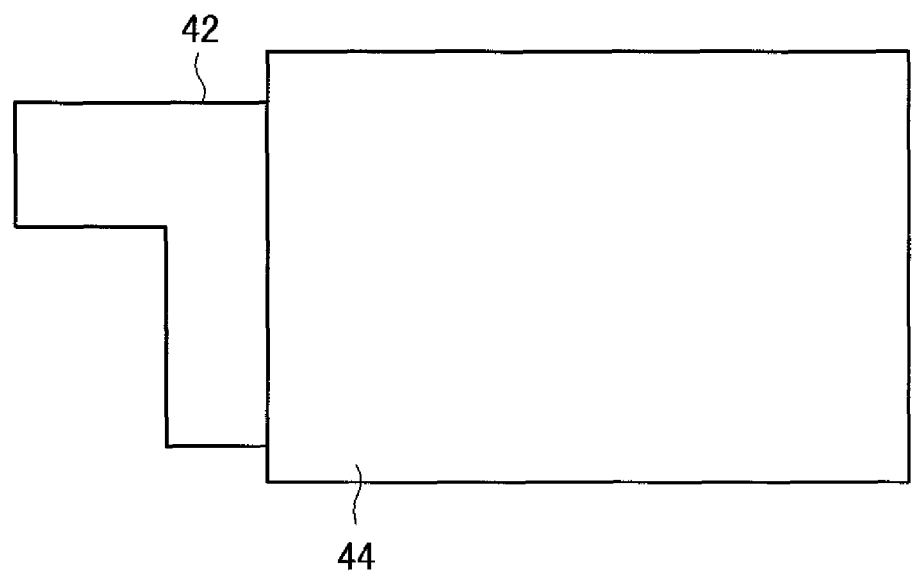
FIG. 2 is a back view showing the liquid crystal display device pertaining to the first embodiment of the invention.
Figure 3:
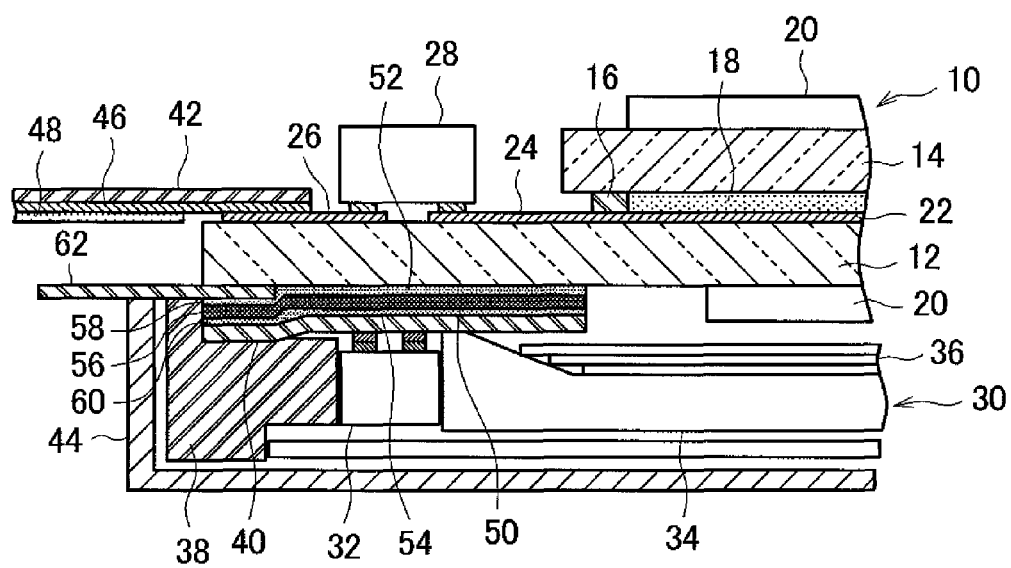
FIG. 3 is an enlarged view in which part of a III-III line cross section of the liquid crystal display device shown in FIG. 1 is omitted.

FIG. 1 is a plan view showing a liquid crystal display device pertaining to a first embodiment of the invention. FIG. 2 is a back view showing the liquid crystal display device pertaining to the first embodiment of the invention. FIG. 3 is an enlarged view in which part of a III-III line cross section of the liquid crystal display device shown in FIG. 1 is omitted.

The liquid crystal display device includes a liquid crystal display panel 10. The liquid crystal display panel 10 includes first and second substrates 12 and 14 that oppose each other. The first and second substrates 12 and 14 are light-transmissive glass substrates, and their end portions are fixed by a seal 16 that is made of a resin, for example. Liquid crystal 18 is enclosed between the first and second substrates 12 and 14. A polarizing plate 20 is disposed on the outer side (the opposite side of opposing surfaces) of each of the first and second substrates 12 and 14. Further, an unillustrated alignment film is disposed on each of the mutually opposing surfaces of the first and second substrates 12 and 14. The first and second substrates 12 and 14 differ in size, with the first substrate 12 having a region that is adjacent to the region opposing the second substrate 14 and does not oppose the second substrate 14 (a region that is exposed from the second substrate 14).

The liquid crystal display panel 10 shown in FIG. 3 is driven by in-plane switching (IPS), so an electrode 22 (a pixel electrode and an opposing electrode) is formed on the surface of the first substrate 12 that opposes the second substrate 14, but there is no electrode on the surface of the second substrate 14 that opposes the first substrate 12. The electrode 22 formed on the first substrate 12 is connected to a first wire 24. The first wire 24 is drawn out as far as onto the region of the first substrate 12 that is exposed from the second substrate 14. Further, a second wire 26 is formed on the surface of the first substrate 12 on which the first wire 24 is formed.

It will be noted that the drive system is not limited to in-plane switching (IPS) and that another system such as twisted nematic (TN) or vertical alignment (VA) may also be employed; electrodes and wires corresponding to the system are formed.

There is a semiconductor integrated circuit 28 on the liquid crystal display panel 10. The semiconductor integrated circuit 28 shown in FIG. 3 is a semiconductor chip and is mounted on the first substrate 12. As an unillustrated modification, an integrated circuit formed from a semiconductor thin film including a thin film transistor (TFT) may also be directly formed on the first substrate 12. The semiconductor integrated circuit 28 is electrically connected to the first and second wires 24 and 26.

A backlight module 30 is disposed opposing the liquid crystal display panel 10. The backlight module 30 includes a light source 32 and a light guide plate 34 and also includes optical films 36 such as a prism sheet and a diffusion sheet. The backlight module 30 includes a resin frame 38 that is positioned around the light source 32, the light guide plate 34 and the optical films 36. The backlight module 30 includes a wiring substrate 40, and the light source 32 is electrically connected to and mounted on the wiring substrate 40.

The liquid crystal display device includes a metal frame 44. The metal frame 44 is a reinforcement member that protects parts that are disposed inside the metal frame 44. The metal frame 44 is made of a metal in consideration of strength. The metal is a conductor. The metal frame 44 has a portion that is positioned around at least one of the liquid crystal display panel 10 and the backlight module 30. In the example of FIG. 3, the metal frame 44 does not have a portion that is positioned around the liquid crystal display panel 10. The metal frame 44 has a portion that opposes the backlight module 30. In other words, the metal frame 44 is a case that has a bottom.

A flexible printed circuit 42 is mounted on the liquid crystal display panel 10 (in the example of FIG. 3, on the first substrate 12). A wire 46 of the flexible printed circuit 42 and the second wire 26 of the liquid crystal display panel 10 oppose each other and are electrically connected. Attachment of the flexible printed circuit 42 to the liquid crystal display panel 10 is achieved by an adhesive (not shown). An anisotropic conductive material (not shown) may also be used in order to achieve a mechanical and electrical connection.

The flexible printed circuit 42 extends as far as a position where it opposes the metal frame 44; in the example in FIG. 3, the flexible printed circuit 42 further extends beyond the metal frame 44. The surface of the flexible printed circuit 42 on which the wire 46 is formed opposes the metal frame 44. The wire 46 is covered by a protective film 48 (e.g., solder resist).

A light-blocking tape 50 is positioned between the liquid crystal display panel 10 and the backlight module 30. The light-blocking tape 50 has a portion that is positioned at least between the semiconductor integrated circuit 28 and the light source 32. The light-blocking tape 50 prevents the ingress of light from the light source 32 to the semiconductor integrated circuit 28 and prevents malfunctioning of the semiconductor integrated circuit 28.

The light-blocking tape 50 includes a light-blocking layer 56 that has a first surface 52 that faces the liquid crystal display panel 10 and a second surface 54 that faces the backlight module 30. The light-blocking tape 50 includes a first pressure-sensitive adhesive layer 58. The first pressure-sensitive adhesive layer 58 has a portion that is formed on the first surface 52 of the light-blocking layer 56 and pressure-sensitively adheres to the liquid crystal display panel 10 (e.g., the first substrate 12). The light-blocking tape 50 includes a second pressure-sensitive adhesive layer 60. The second pressure-sensitive adhesive layer 60 has a portion that is formed on the second surface 54 of the light-blocking layer 56 and pressure-sensitively adheres to the backlight module 30 (e.g., the wiring substrate 40). The liquid crystal display panel 10 and the backlight module 30 are pressure-sensitively adhered together via the first and second pressure-sensitive adhesive layers 58 and 60.

The liquid crystal display device includes an insulating tape 62. The insulating tape 62 is made of an electrical insulator (e.g., a resin). The insulating tape 62 pressure-sensitively adheres to the first or second pressure-sensitive adhesive layer 58 or 60 between the liquid crystal display panel 10 and the backlight module 30. Because it is pressure-sensitive adhesion, the insulating tape 62 is not strongly fixed; some movement is allowed. Further, the insulating tape 62 contacts the liquid crystal display panel 10 in a state where it has none of pressure-sensitive adhesion, adhesion and fixed adhesion with respect to the liquid crystal display panel 10. Consequently, the insulating tape 62 can relatively move with respect to the liquid crystal display panel 10.

The insulating tape 62 shown in FIG. 3 is disposed between the first pressure-sensitive adhesive layer 58 and the liquid crystal display panel 10, so it is easy to peel the first pressure-sensitive adhesive layer 58 from the liquid crystal display panel 10 using the insulating tape 62. In other words, repair of the light-blocking tape 50 can be performed easily.

The insulating tape 62 contacts the surface of the liquid crystal display panel 10 that opposes the backlight module 30. When the insulating tape 62 is disposed in this position, the portion of the insulating tape 62 that projects from the liquid crystal display panel 10 comes closest to the portion of the flexible printed circuit 42 that projects from the liquid crystal display panel 10. For that reason, when the insulating tape 62 is allowed to project from the liquid crystal display panel 10 without being bent, a wide space can be ensured under the insulating tape 62 (in the direction of the region for disposing the metal frame 44), so the height of the portion of the metal frame 44 that is positioned around the backlight module 30 (the length in the direction approaching the portion of the insulating tape 62 that projects from the liquid crystal display panel 10) can be heightened.

The insulating tape 62 extends as far as between the flexible printed circuit 42 and the metal frame 44. The insulating tape 62 contacts the metal frame 44 in a state where it has none of pressure-sensitive adhesion, adhesion and fixed adhesion with respect to the metal frame 44. Consequently, the insulating tape 62 can relatively move with respect to the metal frame 44, so there are few instances where the insulating tape 62 sustains damage by external force from the metal frame 44.

According to the present embodiment, the flexible printed circuit 42 can be protected from the metal frame 44 by the insulating tape 62. Specifically, because the insulating tape 62 is intervened, the insulating tape 62 can protect from the flexible printed circuit 42 contacting the metal frame 44 and breaking and can protect from the wire 46 contacting the metal frame 44 and shorting or breaking. Further, the number of parts does not increase because the first or second pressure-sensitive adhesive layer 58 or 60 of the light-blocking tape 50 is used to attach the insulating tape 62.

According to the present embodiment, the insulating tape 62 is configured so as to move with respect to the liquid crystal display panel 10 and the metal frame 44 (or, in addition to these, the backlight 30), so external force applied to the insulating tape 62 is absorbed by the movement of the insulating tape 62. Thus, impact to the insulating tape 62 can be alleviated.

(Modification)

Figure 4:
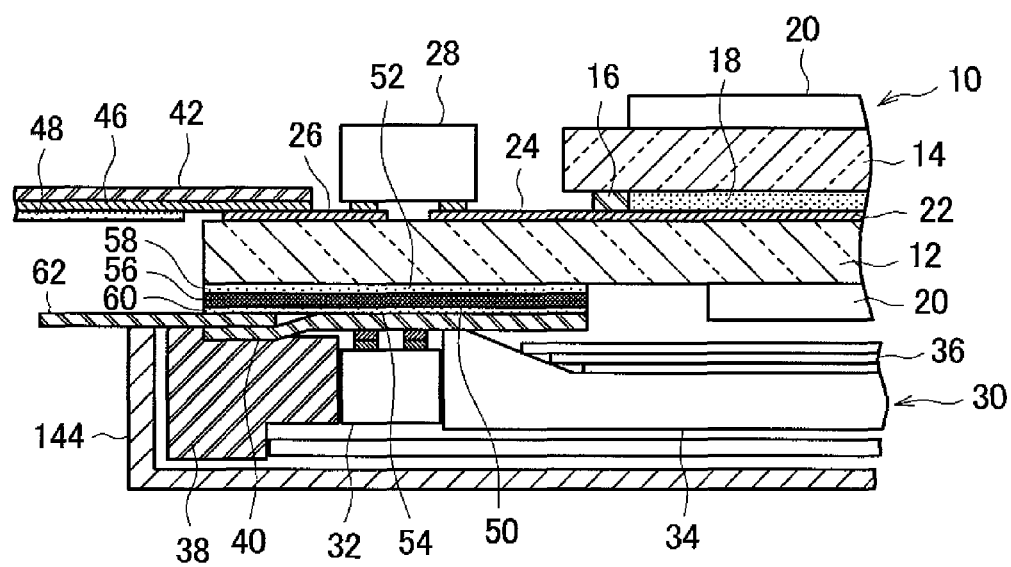
FIG. 4 is a view showing a modification of the liquid crystal display device shown in FIG. 3.

FIG. 4 is a view showing a modification of the liquid crystal display device shown in FIG. 3. In this modification, the insulating tape 62 pressure-sensitively adheres to the second pressure-sensitive adhesive layer 60. In other words, the insulating tape 62 is disposed between the second pressure-sensitive adhesive layer 60 and the backlight module 30 (e.g., the wiring substrate 40).

Consequently, in the example shown in FIG. 4, the insulating tape 62 is, in comparison to the example shown in FIG. 3, away from the flexible printed circuit 42 (lowered downward in FIG. 4), so the upper end of the portion of a metal frame 144 that is located around the backlight module 30 is lower than that of the metal frame 44 shown in FIG. 3 in order to ensure that it does not bend the insulating tape 62.

The insulating tape 62 contacts the backlight module 30 (e.g., the wiring substrate 40) in a state where it has none of pressure-sensitive adhesion, adhesion and fixed adhesion with respect to the backlight module 30. As for the other details of this modification, the content described in the preceding first embodiment applies.

Second Embodiment

Figure 5:
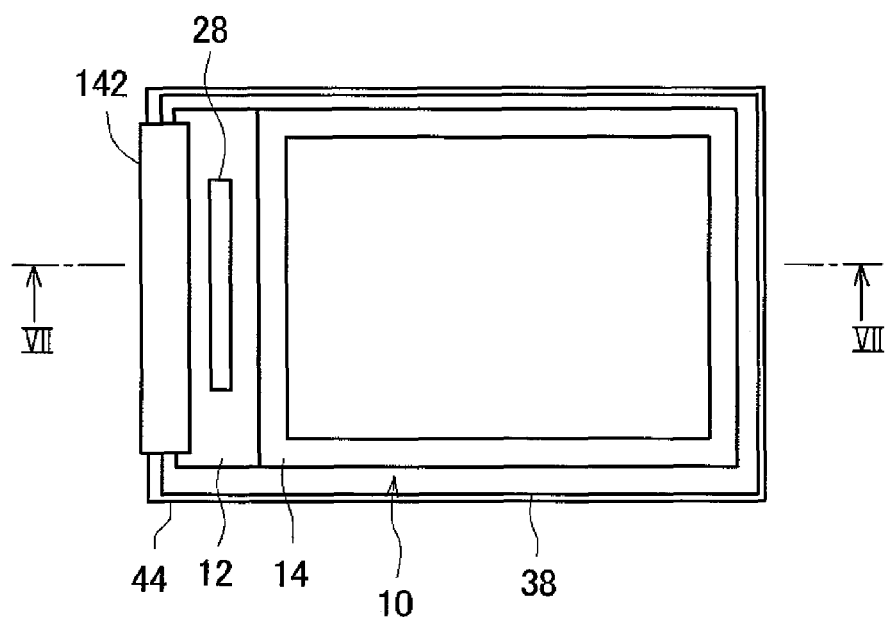
FIG. 5 is a plan view showing a liquid crystal display device pertaining to a second embodiment of the invention.
Figure 6:
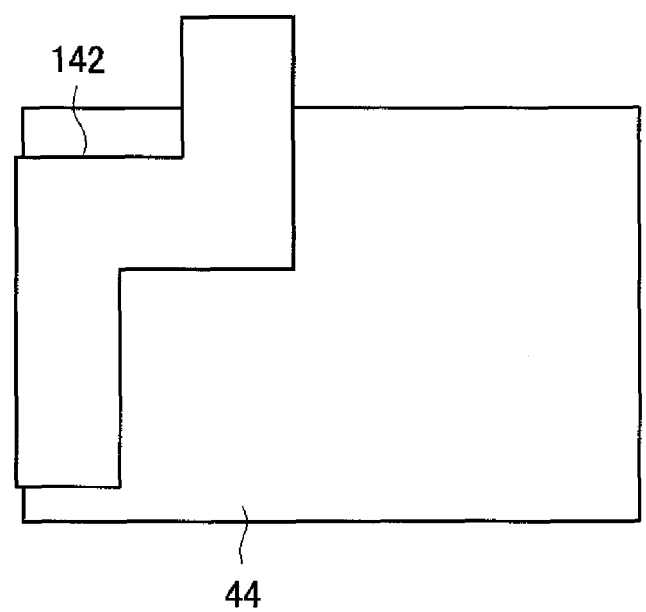
FIG. 6 is a back view showing the liquid crystal display device pertaining to the second embodiment of the invention.
Figure 7:
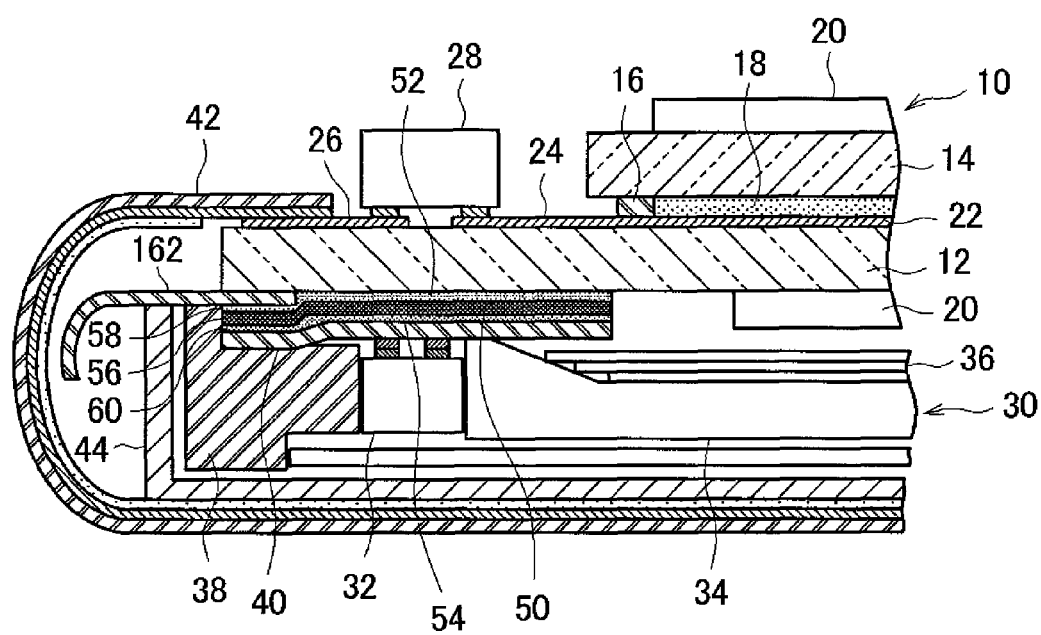
FIG. 7 is an enlarged view in which part of a VII-VII line cross section of the liquid crystal display device shown in FIG. 5 is omitted.

FIG. 5 is a plan view showing a liquid crystal display device pertaining to a second embodiment of the invention. FIG. 6 is a back view showing the liquid crystal display device pertaining to the second embodiment of the invention. FIG. 7 is an enlarged view in which part of a VII-VII line cross section of the liquid crystal display device shown in FIG. 5 is omitted.

In the present embodiment, a flexible printed circuit 142 projects from the liquid crystal display panel 10, bends in a direction where it is side-by-side with the metal frame 44 and extends so as to overlap the backlight module 30 or the liquid crystal display panel 10. In so doing, the long flexible printed circuit 142 can be compactly disposed. An insulating tape 162 extends over the metal frame 44 from the light-blocking tape 50.

In keeping with the shape of the flexible printed circuit 142, the insulating tape 162 bends in a direction where it is side-by-side with the metal frame 44 on the outer side of the metal frame 44. As for the other details of the present embodiment, the content described in the preceding first embodiment applies.

(Modification)

Figure 8:
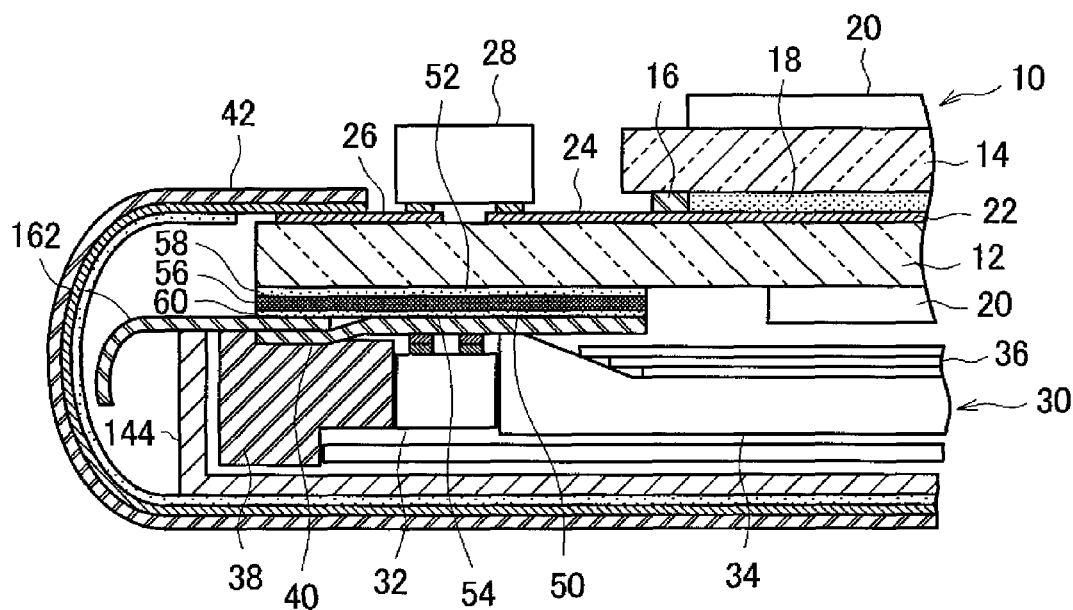
FIG. 8 is a view showing a modification of the liquid crystal display device shown in FIG. 7.

FIG. 8 is a view showing a modification of the liquid crystal display device shown in FIG. 7. In this modification, the insulating tape 162 pressure-sensitively adheres to the second pressure-sensitive adhesive layer 60. In other words, the insulating tape 162 is disposed between the second pressure-sensitive adhesive layer 60 and the backlight module 30.

Consequently, in the example shown in FIG. 8, the insulating tape 162 is, in comparison to the example shown in FIG. 7, away from the portion of the flexible printed circuit 142 that extends straight from the liquid crystal display panel 10 (lowered downward in FIG. 8). Consequently, the upper end of the portion of the metal frame 144 that is located around the backlight module 30 is lower than that of the metal frame 44 shown in FIG. 7 in order to ensure that it does not bend the insulating tape 162.

The insulating tape 162 contacts the backlight module 30 (e.g., the wiring substrate 40) in a state where it has none of pressure-sensitive adhesion, adhesion and fixed adhesion with respect to the backlight module 30. As for the other details of this modification, the content described in the preceding second embodiment applies.

The invention is not limited to the preceding embodiments, and various modifications are possible. For example, the configurations described in the embodiments can be substituted by configurations that are substantially the same, configurations that provide substantially the same action and effects, or configurations that can achieve substantially the same object.

What is claimed is:

1. A liquid crystal display device comprising:
   a liquid crystal display panel;
   a semiconductor integrated circuit on the liquid crystal display panel;
   a backlight module that includes at least a light source and a light guide plate and is disposed opposing the liquid crystal display panel;
   a metal frame that is made of a metal and has a portion that is positioned around at least one of the liquid crystal display panel and the backlight module;
   a flexible printed circuit that is mounted on the liquid crystal display panel and extends as far as a position where it opposes the metal frame;
   a light-blocking tape that has a portion that is positioned at least between the semiconductor integrated circuit and the light source between the liquid crystal display panel and the backlight module; and
   an insulating tape that is made of an electrical insulator, wherein
   the light-blocking tape includes
      a light-blocking layer that has a first surface that faces the liquid crystal display panel and a second surface that faces the backlight module,
      a first pressure-sensitive adhesive layer that has a portion that is formed on the first surface of the light-blocking layer and pressure-sensitively adheres to the liquid crystal display panel and
      a second pressure-sensitive adhesive layer that has a portion that is formed on the second surface of the light-blocking layer and pressure-sensitively adheres to the backlight module, and
   the insulating tape pressure-sensitively adheres to the first or second pressure-sensitive adhesive layer between the liquid crystal display panel and the backlight module and extends as far as between the flexible printed circuit and the metal frame.

2. The liquid crystal display device according to claim 1, wherein the insulating tape extends over the metal frame from the light-blocking tape and bends in a direction where it is side-by-side with the metal frame on the outer side of the metal frame.

3. The liquid crystal display device according to claim 1, wherein the insulating tape pressure-sensitively adheres to the first pressure-sensitive adhesive layer and contacts the liquid crystal display panel in a state where it has none of pressure-sensitive adhesion, adhesion and fixed adhesion with respect to the liquid crystal display panel.

4. The liquid crystal display device according to claim 1, wherein the insulating tape pressure-sensitively adheres to the second pressure-sensitive adhesive layer and contacts the backlight module in a state where it has none of pressure-sensitive adhesion, adhesion and fixed adhesion with respect to the backlight module.

5. The liquid crystal display device according to claim 1, wherein the insulating tape contacts the metal frame in a state where the insulating tape has none of pressure-sensitive adhesion, adhesion and fixed adhesion with respect to the metal frame.

* * * * *